(12) United States Patent
Lu et al.

(10) Patent No.: US 12,141,996 B2
(45) Date of Patent: Nov. 12, 2024

(54) GAZE ESTIMATION CROSS-SCENE ADAPTATION METHOD AND DEVICE BASED ON OUTLIER GUIDANCE

(71) Applicant: Beihang University, Beijing (CN)

(72) Inventors: Feng Lu, Beijing (CN); Yunfei Liu, Beijing (CN)

(73) Assignee: Beihang University, Beijing (CN)

( * ) Notice: Subject to any disclaimer, the term of this patent is extended or adjusted under 35 U.S.C. 154(b) by 398 days.

(21) Appl. No.: 17/561,866

(22) Filed: Dec. 24, 2021

(65) Prior Publication Data

US 2022/0405953 A1 Dec. 22, 2022

(30) Foreign Application Priority Data

Jun. 22, 2021 (CN) .......................... 202110689959.0

(51) Int. Cl.
*G06T 7/70* (2017.01)
*G06F 17/18* (2006.01)
(Continued)

(52) U.S. Cl.
CPC ................ *G06T 7/70* (2017.01); *G06F 17/18* (2013.01); *G06N 3/084* (2013.01); *G06V 10/774* (2022.01);
(Continued)

(58) Field of Classification Search
CPC ............. G06T 7/70; G06T 2207/20081; G06T 2207/20084; G06T 2207/30201; G06T 7/11; G06T 7/251; G06T 7/75; G06T 13/40; G06T 7/73; G06T 7/74; G06T 3/4046; G06T 9/002; G06T 2207/20076; G06F 17/18; G06F 18/2433; G06F 18/214; G06F 3/013; G06F 3/017; G06F 3/012; G06N 3/084; G06N 3/0464; G06N 3/096; G06N 3/098; G06N 20/00; G06N 3/02; G06N 3/08–088; G06N 3/0445; G06N 3/0454; G06N 3/4046; G06N 7/00; G06N 7/01;
(Continued)

(56) References Cited

U.S. PATENT DOCUMENTS 11,238,340 B1 * 2/2022 Anderson ................ G06N 3/02
2020/0225745 A1 * 7/2020 Molin ........................ G06T 7/70
(Continued)

*Primary Examiner* — Jose L Couso

(57) ABSTRACT

The embodiments of the present disclosure disclose gaze estimation cross-scene adaptation method and device based on outlier guidance. A specific implementation of the method comprises: performing pre-training on a source domain based on a given arbitrary gaze estimation model, to obtain a collaborative learning model group; determining an average collaborative model corresponding to each collaborative learning model in the collaborative learning model group, to obtain an average collaborative model group; generating an outlier corresponding to the collaborative learning model group based on a target image, the collaborative learning model group and the average collaborative model group; using an outlier loss function and the outlier to optimize the collaborative learning model group; using any collaborative learning model in the optimized collaborative learning model group to perform gaze estimation. This implementation can effectively stabilize the cross-domain adaptation process and improve the scalability of the system.

6 Claims, 2 Drawing Sheets

(51) Int. Cl.
*G06N 3/084* (2023.01)
*G06V 10/774* (2022.01)
*G06V 10/82* (2022.01)
*G06V 40/18* (2022.01)

(52) U.S. Cl.
CPC ............ G06V 10/82 (2022.01); G06V 40/193 (2022.01); *G06T 2207/20081* (2013.01); *G06T 2207/20084* (2013.01); *G06T 2207/30201* (2013.01)

(58) Field of Classification Search
CPC .... G06V 10/774; G06V 10/82; G06V 40/193; G06V 40/18; G06V 40/171; G06V 10/755; G06V 40/168; G06V 40/174; G06V 10/454; G06V 10/54; G06V 30/18057; Y02T 10/40; G02B 27/0093; G06K 7/1482; Y10S 128/925
See application file for complete search history.

(56) References Cited

U.S. PATENT DOCUMENTS

| | | | |
|---|---|---|---|
| 2020/0364539 A1* | 11/2020 | Anisimov | G06F 3/011 |
| 2021/0012157 A1* | 1/2021 | Asplund | G01S 7/282 |
| 2021/0056303 A1* | 2/2021 | Yamamoto | G06V 30/422 |
| 2022/0148322 A1* | 5/2022 | Okatani | G08B 21/182 |
| 2022/0366568 A1* | 11/2022 | Arar | G06N 3/045 |

\* cited by examiner

GAZE ESTIMATION CROSS-SCENE ADAPTATION METHOD AND DEVICE BASED ON OUTLIER GUIDANCE

CROSS-REFERENCE TO RELATED APPLICATIONS

The present application is based on, and claims priority from, Chinese application number CN202110689959.0, filed Jun. 22, 2021, the disclosure of which is hereby incorporated by reference herein in its entirety.

TECHNICAL FIELD

The embodiments of the present disclosure relate to the field of computer technology, and in particular, to gaze estimation cross-scene adaptation method and device based on outlier guidance.

BACKGROUND

Gaze information has been used in various applications, such as human-computer interaction, virtual augmented reality games, smart cockpit systems, medical analysis, etc. With the development of deep learning technology, the task of gaze estimation based on appearance has attracted much attention recently. In order to improve the performance of gaze estimation, many large-scale gaze estimation data sets have been proposed. In order to reduce the cross-domain problem in practical applications, methods based on adversarial learning came into being. The core idea of these methods is to introduce a discriminator to distinguish the image data in different domains, and then make the features extracted by the gaze estimation part more versatile. In addition, methods based on self-training, such as pseudo-labeling, have also been proposed to solve the cross-domain adaptation problem. These methods use the prediction results of the model itself to optimize the model parameters in turn, which can help the model to extract the features that are truly relevant to the task.

However, when the above methods are used for gaze estimation, the following technical problems often exist:

The environment, background, and lighting conditions etc. of large-scale gaze estimation data sets are different. When the gaze estimation model trained on a single data set (source domain) is applied to a new target domain, the generalization capability of the model is usually limited, which causes the performance of the method to be greatly reduced. Whereas, the method based on adversarial learning can hardly guarantee that the features extracted by the model are truly related to the gaze estimation task. Besides, the method based on self-training, such as pseudo-labeling, focuses on the classification task, instead of the regression task. Directly applying this method to such regression task as gaze estimation is prone to have the problem of error amplification.

SUMMARY

The content of the present disclosure is to introduce concepts in a brief form, and these concepts will be described in detail in the following section of the detailed description of the disclosure. The content of the present disclosure is not intended to identify the key features or essential features of the claimed technical solution, nor is it intended to limit the scope of the claimed technical solution. Some embodiments of the present disclosure propose a gaze estimation cross-scene adaptation method and device based on outlier guidance, to solve one or more of the technical problems mentioned in the background section above.

In the first aspect, some embodiments of the present disclosure provide a gaze estimation cross-scene adaptation method based on outlier guidance, the method comprising: performing pre-training on a source domain based on a given arbitrary gaze estimation model, to obtain a collaborative learning model group; determining an average collaborative model corresponding to each collaborative learning model in the above collaborative learning model group, to obtain an average collaborative model group; generating an outlier corresponding to the above collaborative learning model group based on a target image, the above collaborative learning model group and the above average collaborative model group; using an outlier loss function and the above outlier to optimize the above collaborative learning model group; using any collaborative learning model in the optimized collaborative learning model group to perform gaze estimation.

In the second aspect, some embodiments of the present disclosure provide a gaze estimation cross-scene adaptation device based on outlier guidance, the device comprising: a pre-training unit configured to perform pre-training on a source domain based on a given arbitrary gaze estimation model to obtain a collaborative learning model group; a determining unit configured to determine an average collaborative model corresponding to each collaborative learning model in the above collaborative learning model group to obtain an average collaborative model group; a generating unit configured to generate an outlier corresponding to the above collaborative learning model group based on a target image, the above collaborative learning model group and the above average collaborative model group; an optimizing unit configured to use an outlier loss function and the above outlier to optimize the above collaborative learning model group; a gaze estimating unit configured to use any collaborative learning model in the optimized collaborative learning model group to perform gaze estimation.

The above embodiments of the present disclosure have the following beneficial effects that: the gaze estimation cross-scene adaptation method based on outlier guidance of some embodiments of the present disclosure can effectively stabilize the cross-domain adaptation process and improve the scalability of the system. On this basis, the gaze estimation cross-scene adaptation method based on outlier guidance of some embodiments of the present disclosure, firstly, constructs a learning framework guided by outliers, for the cross-domain adaptation problem of gaze estimation tasks, and uses the invented outlier loss function to ensure the reliability of mutual learning and can be applied to various gaze estimation models. The framework is very flexible and can plug and play for a variety of different gaze estimation methods, which improves the scalability of the entire system. Secondly, a collaborative learning strategy guided by outliers is established, and by constructing a collaborative learning group and an average collaborative group, a cross-domain adaptation framework is built further. Based on this framework combined with the collaborative learning strategy, only a small number of images in the target domain are needed to complete the cross-domain adaptation of the gaze estimation model. Finally, a loss function based on outliers is constructed, which can help better perform the domain adaptation task. By imposing rather severe penalties on the outlier prediction of the model and relatively mild penalties on the non-outlier prediction, the adaptation process can be effectively stabilized and the model's adaptation performance results are improved.

BRIEF DESCRIPTION OF THE DRAWINGS

The above and other features, advantages, and aspects of the embodiments of the present disclosure will become more apparent in conjunction with the accompanying drawings and with reference to the following embodiments. Throughout the drawings, the same or similar reference signs indicate the same or similar elements. It should be understood that the drawings are schematic, and the components and elements are not necessarily drawn to scale.

DETAILED DESCRIPTION

Figure 1:
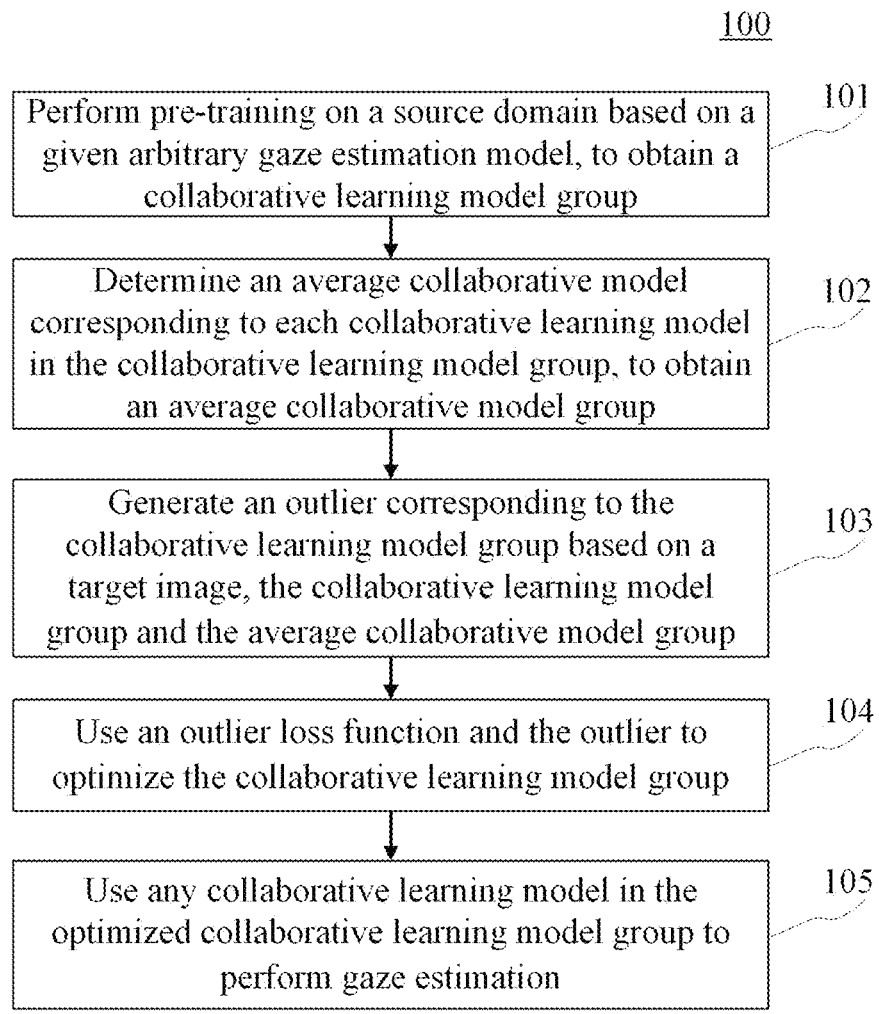
FIG. 1 is a flowchart of some embodiments of the gaze estimation cross-scene adaptation method based on outlier guidance according to the present disclosure.

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, but not to limit the protection scope of the present disclosure.

Besides, it should be noted that, for ease of description, only the portions related to the relevant disclosure are shown in the drawings. In the case of no confliction, the embodiments in the present disclosure and the features in the embodiments can be combined with each other.

It should be noted that such concepts as "first" and "second" etc. mentioned in the present disclosure are only used to distinguish different devices, modules or units, but not to limit the order of functions performed by these devices, modules or units, or the interdependence therebetween.

It should be noted that such adjuncts as "one" and "more" mentioned in the present disclosure are illustrative, not restrictive, and those skilled in the art should understand that, unless the context clearly indicates otherwise, they should be understood as "one or more".

The names of messages or information exchanged between multiple devices in the embodiments of the present disclosure are only used for illustrative purposes, not for limiting the scope of these messages or information.

Hereinafter, the present disclosure will be described in detail with reference to the drawings and in conjunction with the embodiments.

FIG. 1 shows a process 100 of some embodiments of the gaze estimation cross-scene adaptation method based on outlier guidance, according to the present disclosure. This gaze estimation cross-scene adaptation method based on outlier guidance comprises the following steps:

Step 101: Perform pre-training on a source domain based on a given arbitrary gaze estimation model to obtain a collaborative learning model group.

In some embodiments, the executive body of the gaze estimation cross-scene adaptation method based on outlier guidance may perform pre-training on a source domain based on a given arbitrary gaze estimation model to obtain a collaborative learning model group. Wherein, the network structure of the above gaze estimation model may be a Resnet (deep residual network) structure. The above executive body may use a multilayer perceptron to return to the direction of gaze. The collaborative learning models in the above collaborative learning model group have the same convolutional neural network structure.

As an example, the gaze estimation model is pre-trained on the source domain data, and the number of iterations of training may be 200 times. After the training is completed, the top 10 models with high performance are selected as a group (i.e., collaborative learning group), as members of the collaborative learning group.

Step 102: Determine an average collaborative model corresponding to each collaborative learning model in the collaborative learning model group, to obtain an average collaborative model group.

In some embodiments, the above executive body may obtain an average collaborative model group by copying each collaborative learning model in the above collaborative learning model group as a corresponding average collaborative model.

In certain optional implementations of some embodiments, the above executive body may employ a manner of exponential moving average, to determine the average collaborative model corresponding to each collaborative learning model in the above collaborative learning model group to obtain an average collaborative model group. Wherein, the construction method of the exponential moving average model may be as follows:

$$E^{(T)}(\theta) = \alpha \times E^{(T-1)}(\theta) + (1-\alpha) \times \theta.$$

Wherein, E represents the exponential moving average parameter. T represents the number of iterations. $E^{(T)}$ represents the exponential moving average parameter at the $T^{th}$ iteration. N represents the weight, which can be 0.99. $E^{(T-1)}$ represents the exponential moving average parameter at the $T-1^{th}$ iteration. θ represents the model parameter.

Wherein, the exponential moving average model can retain the timing information in the model adaptation process, thereby obtaining more reliable prediction results, and avoiding error amplification caused by excessively dramatic gradient descent.

Step 103: Generate an outlier corresponding to the collaborative learning model group based on a target image, the collaborative learning model group and the average collaborative model group.

In some embodiments, the above executive body may, through the Dixon test, generate an outlier corresponding to the collaborative learning model group based on the target image, the collaborative learning model group and the average collaborative model group.

In certain optional implementations of some embodiments, the above executive body generating an outlier corresponding to the collaborative learning model group based on the target image, the above collaborative learning model group and the above average collaborative model group may include the following steps:

The first step is to generate a prediction result corresponding to the collaborative learning model group and a prediction result corresponding to the average collaborative model group based on the target image, the above collaborative learning model group and the above average collaborative model group.

The second step is to determine a Gaussian distribution based on the above prediction result corresponding to the average collaborative model group. Wherein, the construction method of the Gaussian distribution can be as follows:

$$\begin{cases} \mu = \frac{1}{H} \times \sum_{k=1}^{H} \overline{g_k} \\ \sigma^2 = \frac{1}{H-1} \times \sum_{k=1}^{H} (\overline{g_k} - \mu)^2 \end{cases}.$$

Wherein, $\mu$ represents the average value of the prediction results of the average collaborative models in the above average collaborative model group. H represents the number of models during pre-training. k represents the serial number. $\overline{g}$ represents the prediction result of the average collaborative model in the above average collaborative model group. $\overline{g_k}$ represents the prediction result of the $k^{th}$ average collaborative model in the above average collaborative model group. $\sigma$ represents the standard deviation of the prediction results of the average collaborative models in the above average collaborative model group. $\mu$ represents the average value of the prediction results of the average collaborative models in the above average collaborative model group. $u_{1-\epsilon}$ represents the 1−ϵ quantile of the normal distribution. ϵ represents the significance level used to determine outliers.

Wherein, in response to the prediction result $g_k$ of the $k^{th}$ collaborative learning model in the collaborative learning model group satisfies the following condition:

$$\left| \frac{g_k - \mu}{\sigma} \right| > u_{1-\epsilon}.$$

Then, it is judged as an outlier prediction. The exponential moving average model retains the timing information during the model iteration process, and can give more stable and reliable predictions. Using the prediction of the exponential moving average model to guide the prediction result of the model can prevent the model from generating drastic fluctuations and avoid error amplification. Therefore, in order to utilize the robustness and reliability brought by mutual learning and exponential moving average, the present disclosure detects the outlier prediction of the model on a target domain, according to the prediction result of the exponential moving average model on the target domain, thereby obtaining the direction of model optimization.

The third step is to perform an outlier prediction on the prediction result corresponding to the above collaborative learning model group according to the above Gaussian distribution, to obtain the aforementioned outlier.

Step 104: Use an outlier loss function and the outlier to optimize the collaborative learning model group.

In some embodiments, the above executive body may use an outlier loss function and the above outlier to optimize the above collaborative learning model group through a back propagation method. Wherein, the construction method of the outlier loss function can be as follows:

$$L_{OG}(g_k, \mu, \sigma) = \gamma \left| \varphi\left(\frac{g_k - \mu}{\sigma}\right) - \varphi(0) \right| + 1_{\left[\left|\frac{g_k-\mu}{\sigma}\right| > u_{1-\epsilon}\right]} \left|\frac{g_k - \mu}{\sigma}\right|.$$

Wherein, $\gamma$ represents the weighting factor. $\varphi$ represents the distribution function of the standard normal distribution. k represents the serial number. g represents the prediction result of the collaborative learning model in the above collaborative learning model group. $g_k$ represents the prediction result of the $k^{th}$ collaborative learning model in the above collaborative learning model group. $\mu$ represents the average value of the prediction results of the average collaborative models in the above average collaborative model group. $\sigma$ represents the standard deviation of the prediction results of the average collaborative models in the above average collaborative model group. $\varphi(0)$ represents the value of the distribution function of the standard normal distribution at 0, that is, 0.5. $u_{1-\epsilon}$ represents the 1−ϵ quantile of the normal distribution, and ϵ represents the significance level for judging the outlier, which can be taken as 0.05. $L_{OG}(g_k, \mu, \sigma)$ represents the above outlier loss function.

Wherein, the distribution function of the above standard normal distribution is:

$$\varphi(x) = \int_{-\infty}^{x} \frac{1}{\sqrt{2\pi}} e^{-\frac{t^2}{2}} dt.$$

Wherein, x represents the independent variable. $\varphi(\ )$ represents the distribution function. $\varphi(x)$ represents the distribution function of the independent variable x. ∞ means infinity. $\pi$ represents the first constant, the value of which can be 3.14. e represents the second constant, the value of which can be 2.17.

Step 105: Use any collaborative learning model in the optimized collaborative learning model group to perform gaze estimation.

In some embodiments, the above executive body may use any collaborative learning model in the optimized collaborative learning model group to perform gaze estimation. Wherein, the above executive body can randomly select a small number of pictures on the target domain, and complete the cross-domain adaptation of the model by iteratively updating a small number of times on the small number of pictures.

Figure 2:
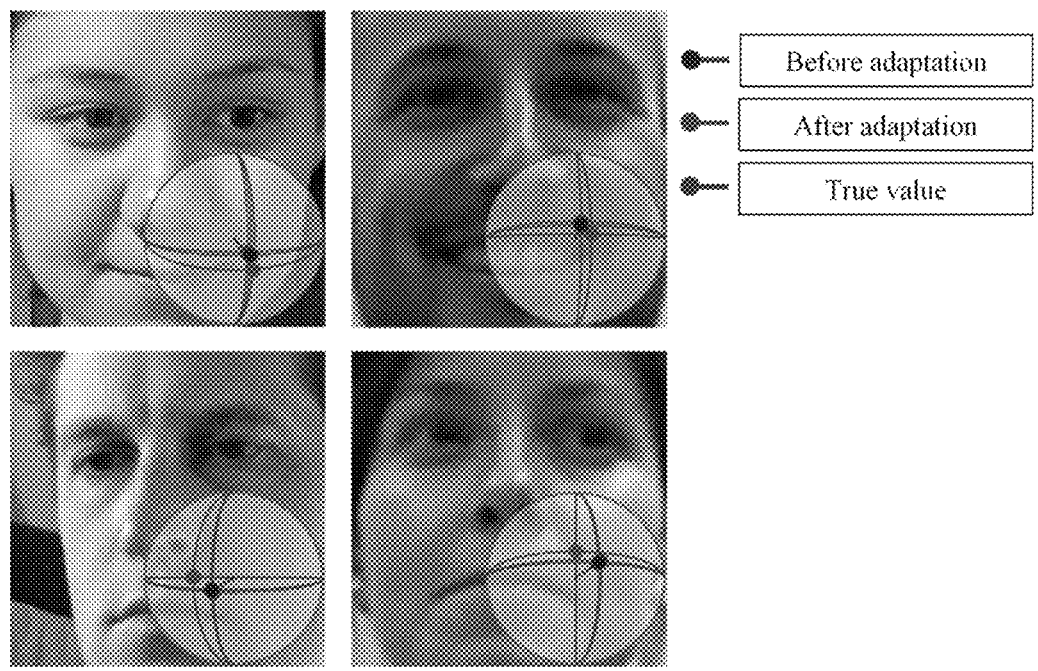
FIG. 2 is a schematic diagram of the prediction result image of some embodiments of the gaze estimation cross-scene adaptation method based on outlier guidance according to the present disclosure.

As an example, the results before and after the adaptation on the target domain image are shown in FIG. 2.

The above embodiments of the present disclosure have the following beneficial effects that: the gaze estimation cross-scene adaptation method based on outlier guidance of some embodiments of the present disclosure can effectively stabilize the cross-domain adaptation process and improve the scalability of the system. On this basis, the gaze estimation cross-scene adaptation method based on outlier guidance of some embodiments of the present disclosure, firstly, constructs a learning framework guided by outliers, for the cross-domain adaptation problem of gaze estimation tasks, and uses the invented outlier loss function to ensure the reliability of mutual learning and can be applied to various gaze estimation models. The framework is very flexible and can plug and play for a variety of different gaze estimation methods, which improves the scalability of the entire system. Secondly, a collaborative learning strategy guided by outliers is established, and by constructing a collaborative learning group and an average collaborative group, a cross-domain adaptation framework is further built. Based on this framework combined with the collaborative learning strategy, only a small number of images in the target domain are needed to complete the cross-domain adaptation of the gaze estimation model. Finally, a loss function based on outliers is constructed, which can help to better perform the domain adaptation task. By imposing rather severe penalties on the outlier prediction of the model and relatively mild penalties on the non-outlier prediction, the adaptation process can be effectively stabilized and the model's adaptation performance results are improved.

Figure 3:
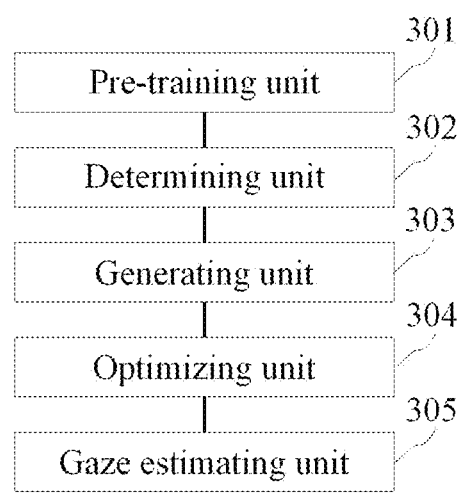
FIG. 3 is a schematic structural diagram of some embodiments of the gaze estimation cross-scene adaptation device based on outlier guidance according to the present disclosure.

With further reference to FIG. 3, as an implementation of the methods shown in the above figures, the present disclosure provides some embodiments of the gaze estimation cross-scene adaptation device based on outlier guidance. These embodiments of device correspond to those embodiments of method shown in FIG. 1. The device can be specifically applied to various electronic devices.

As shown in FIG. 3, the gaze estimation cross-scene adaptation device 300 based on outlier guidance in some embodiments comprises: a pre-training unit 301, a determining unit 302, a generating unit 303, an optimizing unit 304 and a gaze estimating unit 305. Wherein, the pre-training unit 301 is configured to perform pre-training on a source domain based on a given arbitrary gaze estimation model, to obtain a collaborative learning model group; the determining unit 302 is configured to determine an average collaborative model corresponding to each collaborative learning model in the above collaborative learning model group, to obtain an average collaborative model group; the generating unit 303 is configured to generate an outlier corresponding to the above collaborative learning model group based on the target image, the above collaborative learning model group and the above average collaborative model group; the optimizing unit 304 is configured to use an outlier loss function and the above outlier to optimize the above collaborative learning model group; the gaze estimating unit 305 is configured to use any collaborative learning model in the optimized collaborative learning model group to perform gaze estimation.

It should be understood that the units recorded in the device 300 correspond to the steps in the method described with reference to FIG. 1. Therefore, the operations, features, and beneficial effects described above for the method are also applicable to the device 300 and the units contained therein, and will not be repeated here.

What is claimed is:

1. A method for gaze estimation cross-scene adaptation based on outlier guidance, comprising:
    performing pre-training on a source domain based on a given arbitrary gaze estimation model, to obtain a collaborative learning model group;
    determining an average collaborative model corresponding to each collaborative learning model in the collaborative learning model group, to obtain an average collaborative model group;
    generating an outlier corresponding to the collaborative learning model group, based on a target image, the collaborative learning model group and the average collaborative model group;
    using an outlier loss function and the outlier to optimize the collaborative learning model group; and
    using any collaborative learning model in the optimized collaborative learning model group to perform gaze estimation,
    wherein the determining the average collaborative model corresponding to each collaborative learning model in the collaborative learning model group includes:
        employing a manner of exponential moving average, to determine the average collaborative model corresponding to each collaborative learning model in the collaborative learning model group.

2. The method of claim 1, wherein, collaborative learning models in the collaborative learning model group have the same convolutional neural network structure.

3. The method of claim 1, wherein, the generating an outlier corresponding to the collaborative learning model group based on a target image, the collaborative learning model group and the average collaborative model group, includes:
    generating a prediction result corresponding to the collaborative learning model group and a prediction result corresponding to the average collaborative model group, based on the target image, the collaborative learning model group and the average collaborative model group;
    determining a Gaussian distribution based on the prediction result corresponding to the average collaborative model group;
    performing an outlier prediction on the prediction result corresponding to the collaborative learning model group according to the above Gaussian distribution, to obtain the outlier.

4. The method of claim 3, wherein, the outlier loss function is constructed by way of as follows:

$$L_{OG}(g_k, \mu, \sigma) = \gamma \left| \varphi\left(\frac{g_k - \mu}{\sigma}\right) - \varphi(0) \right| + 1_{\left[\left|\frac{g_k - \mu}{\sigma}\right| > u_{1-\epsilon}\right]} \left|\frac{g_k - \mu}{\sigma}\right|,$$

wherein, γ represents a weighting factor, φ represents a distribution function of a standard normal distribution, k represents a serial number, g represents the prediction result of the collaborative learning model in the collaborative learning model group, $g_k$ represents the prediction result of the $k^{th}$ collaborative learning model in the collaborative learning model group, μ represents an average value of the prediction results of the average collaborative models in the average collaborative model group, σ represents a standard deviation of the prediction results of the average collaborative models in the average collaborative model group, φ(0) represents a value of the distribution function of the standard normal distribution at 0, that is, 0.5, $u_{1-\epsilon}$ represents a 1−ϵ quantile of the normal distribution, and ϵ represents a significance level for judging the outlier, which can be taken as 0.05, and $L_{OG}(g_k, \mu, \sigma)$ represents the outlier loss function.

5. The method of claim 4, wherein, the using an outlier loss function and the outlier to optimize the collaborative learning model group, includes:
    using the outlier loss function and the outlier to optimize the collaborative learning model group through a back propagation method.

6. A device for gaze estimation cross-scene adaptation based on outlier guidance applied to an electronic device, wherein the device for gaze estimation cross-scene adaptation based on outlier guidance is configured
    to implement the method according to claim 1.

* * * * *